(12) United States Patent
Zheng (10) Patent No.: US 12,557,178 B2
(45) Date of Patent: Feb. 17, 2026

(54) SIDELINK DISCONTINUOUS RECEPTION IMPLEMENTATION METHOD AND APPARATUS AND TERMINAL

(71) Applicant: VIVO MOBILE COMMUNICATION CO., LTD., Guangdong (CN)

(72) Inventor: Qian Zheng, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 279 days.

(21) Appl. No.: 18/479,077

(22) Filed: Oct. 1, 2023

(65) Prior Publication Data

US 2024/0032143 A1 Jan. 25, 2024

Related U.S. Application Data

(63) Continuation of application No. PCT/CN2022/083243, filed on Mar. 28, 2022.

(30) Foreign Application Priority Data

Apr. 1, 2021 (CN) .......................... 202110357585.2

(51) Int. Cl.
*H04W 76/28* (2018.01)
*H04W 72/25* (2023.01)

(52) U.S. Cl.
CPC ........... *H04W 76/28* (2018.02); *H04W 72/25* (2023.01)

(58) Field of Classification Search
CPC ....... H04W 76/28; H04W 72/25; H04W 4/18; H04W 52/0216; H04W 92/18; H04W 4/06; Y02D 30/70
See application file for complete search history.

(56) References Cited

U.S. PATENT DOCUMENTS

2019/0037495 A1 1/2019 John Wilson et al.
2019/0174411 A1 6/2019 Xu et al.
(Continued)

FOREIGN PATENT DOCUMENTS

CN 109196939 A 1/2019
CN 110999409 A 4/2020
(Continued)

OTHER PUBLICATIONS

Wu, Jinyan, et al. "Adaptive DRX method for MTC device energy saving by using a machine learning algorithm in an MEC framework." IEEE Access 9 (2021): 10548-10560. (Year: 2021).*

(Continued)

*Primary Examiner* — Sharad Rampuria
(74) *Attorney, Agent, or Firm* — BROOKS KUSHMAN P.C.

(57) ABSTRACT

An implementation method and apparatus for sidelink discontinuous reception and a terminal. The sidelink discontinuous reception implementation method in the embodiment of this application includes: receiving, by a first terminal, a sidelink discontinuous reception command media access control control element SL DRX command MAC CE sent by a second terminal, where the SL DRX command MAC CE carries a valid object and/or a range of the SL DRX command MAC CE; and performing, by the first terminal, a first operation according to the valid object and/or range of the SL DRX command MAC CE. This can further improve the flexibility of SL DRX power saving control while satisfying the terminal power saving requirement.

17 Claims, 6 Drawing Sheets

(56) References Cited

U.S. PATENT DOCUMENTS

| | | | |
|---|---|---|---|
| 2019/0254110 | A1 | 8/2019 | He et al. |
| 2020/0245395 | A1 | 7/2020 | Zhang et al. |
| 2021/0037468 | A1 | 2/2021 | Huang et al. |
| 2021/0059005 | A1* | 2/2021 | Hosseini ............... H04W 76/28 |
| 2021/0267009 | A1* | 8/2021 | Van Phan ............ H04W 76/14 |
| 2022/0256625 | A1* | 8/2022 | Park ..................... H04W 76/14 |
| 2023/0066448 | A1 | 3/2023 | Tseng et al. |
| 2023/0276359 | A1 | 8/2023 | Xu et al. |

FOREIGN PATENT DOCUMENTS

| | | | |
|---|---|---|---|
| CN | 111727635 | A | 9/2020 |
| CN | 112312526 | A | 2/2021 |
| CN | 112512102 | A | 3/2021 |
| JP | 2019525607 | A | 9/2019 |
| JP | 2023510425 | A | 3/2023 |
| KR | 20190039101 | A | 4/2019 |
| WO | 2020140815 | A1 | 7/2020 |
| WO | 2020240247 | A1 | 12/2020 |

OTHER PUBLICATIONS

International Search Report and Written Opinion for Application No. PCT/CN2022/083243, dated Jul. 5, 2022, 7 Pages.

Extended European Search Report for Application No. 22778830.4, dated Sep. 26, 2024, 9 Pages.

3GPP "3rd Generation Partnership Project; Technical Specification Group Radio Access Network; NR; Medium Access Control (MEC) protocol specification (Release 16)" 3GPP TS 38.321 v16.1.0 (Jul. 2020), 2020, 151 Pages.

Samsung "MAC PDU Format for NR Sidelink" 3GPP TSG-RAN2 105bis, Xian, China, Apr. 2019, R2-1903276, 3 Pages.

Intel Corporation "On general sidelink DRX design" 3GPP TSG RAN WG2 Meeting #112-e, Electronic meeting, Nov. 2020, R2-2008978, 6 Pages.

LG (rapporteur) "Summary of email discussion [702][Sle] High-level principles for SL DRX (LG)" 3GPP TSG-RAN WG2 #113-e, E-meeting, Jan. 2021, R2-2101727, 85 Pages.

First Office Action for Japanese Application No. 2023-558879, dated Jul. 11, 2024, 4 Pages.

LG Electronics "Status Report to TSG" 3GPP TSG RAN meeting #91e, Electronic Meeting, Mar. 2021, RP-210767, 17 Pages.

LG Electronics Inc. Discussion on Sidelink DRX. 3GPP TSG-RAN WG2 Meeting #113 electronic. R2-2100637. Online. Jan.-Feb. 2021. 6 pages.

3rd Generation Partnership Project, Technical Specification Group Radio Access Network; NR, Medium Access Control (MAC) protocol specification (Release 16). 3GPP TS 38.321 V16.4.0. Online. Mar. 2021. 155 pages.

First Korean Office Action for Korean Patent Application No. 10-2023-7032037 mailed Oct. 14, 2025. 11 pages.

* cited by examiner

SIDELINK DISCONTINUOUS RECEPTION IMPLEMENTATION METHOD AND APPARATUS AND TERMINAL

CROSS-REFERENCE TO RELATED APPLICATIONS

This application is a continuation of PCT International Application No. PCT/CN2022/083243 filed on Mar. 28, 2022, which claims priority to Chinese Patent Application No. 2021103575852, filed on Apr. 1, 2021, which are incorporated herein by reference in their entireties.

TECHNICAL FIELD

This application belongs to the technical field of communications, and in particular relates to an implementation method and apparatus for sidelink discontinuous reception and a terminal.

BACKGROUND

Figure 1:
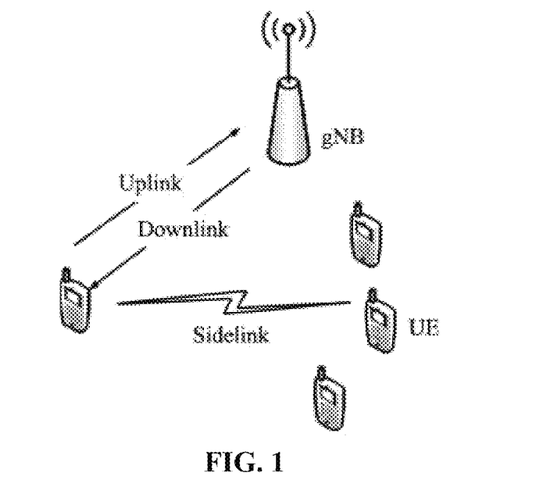
FIG. 1 is a schematic diagram of an LTE uplink/downlink/sidelink.

The long term evolution (LTE) system supports sidelinks (SL) from the 12th release. FIG. 1 is a schematic diagram of an LTE uplink/downlink/sidelink. The sidelink is used for direct data transmission between user equipments (UE) without a network device. The current sidelink transmission is mainly divided into several transmission forms, such as broadcast, groupcast and unicast.

Figure 2:
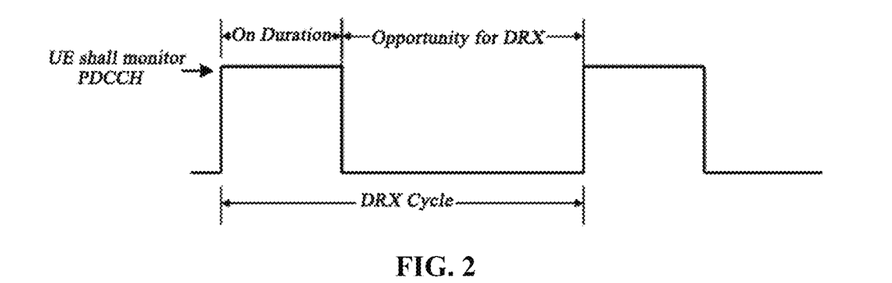
FIG. 2 is a schematic diagram of a DRX cycle.

Both LTE and NR have introduced the DRX (Discontinuous Reception) mechanism, and the UE power saving can be achieved by configuring the DRX on and off time. DRX adopts periodic configuration, as shown in FIG. 2. At the beginning of each DRX cycle, a short continuous reception state is first entered, which is called on duration (monitoring period). During the on duration, a terminal needs to monitor a physical downlink control channel (PDCCH) to determine whether there is resource allocation for the terminal. If the terminal does not have data scheduling and data transmission within the on duration, it enters an inactive state until the next DRX cycle, and only when drx-onDurationTimer starts, can receive downlink transmission again. During on duration, if the UE is scheduled and receives data in a certain slot, the UE probably continues to be scheduled in the next few slots. Therefore, each time the UE is scheduled to transmit data for the first time, the timer drx-InactivityTimer is started or restarted, and the UE will remain in the active state until the timer times out. When the UE receives a discontinuous reception command media access control control element (DRX Command MAC CE) from a base station, it will stop running relevant DRX timers (such as drx-onDurationTimer and drx-InactivityTimer), so that the UE enters the DRX sleep/off state to realize UE power saving.

The control granularity of the current Uu DRX command MAC CE is per UE. For SL, considering that UE may perform multiple unicast/multicast services at the same time, and UE may establish multiple unicast connections/multicast groups at the same time, the format of the Uu DRX command MAC CE at a per UE granularity is less flexible and is not suitable for the DRX mechanism in SL scenarios.

SUMMARY

Embodiments of this application provide an implementation method and apparatus for sidelink discontinuous reception and a terminal.

According to a first aspect, an implementation method for sidelink discontinuous reception is provided, which is applied to a first terminal, and the method includes:
  receiving, by the first terminal, a sidelink discontinuous reception command media access control element SL DRX command MAC CE sent by a second terminal, where the SL DRX command MAC CE carries a valid object and/or a range of the SL DRX command MAC CE; and
  performing, by the first terminal, a first operation according to the valid object and/or range of the SL DRX command MAC CE.

According to a second aspect, an implementation method for sidelink discontinuous reception is provided, which is applied to a second terminal, and the method includes:
  sending, by the second terminal, a sidelink discontinuous reception command media access control control element SL DRX command MAC CE to a first terminal, where the SL DRX command MAC CE carries a valid object and/or a range of the SL DRX command MAC CE.

According to a third aspect, an implementation apparatus for sidelink discontinuous reception is provided, including:
  a first receiving unit, configured to receive a sidelink discontinuous reception command media access control control element SL DRX command MAC CE sent by a second terminal, where the SL DRX command MAC CE carries a valid object and/or a range of the SL DRX command MAC CE; and
  a first processing unit, configured to perform a first operation according to the valid object and/or range of the SL DRX command MAC CE.

According to a fourth aspect, an implementation apparatus for sidelink discontinuous reception is provided, including:
  a first sending unit, configured to send a sidelink discontinuous reception command media access control control element SL DRX command MAC CE to a first terminal, where the SL DRX command MAC CE carries a valid object and/or a range of the SL DRX command MAC CE.

According to a fifth aspect, a terminal is provided. The terminal includes a processor, a memory, and a program or an instruction that is stored in the memory and that can be run on the processor, where the program or the instruction is executed by the processor to implement the steps of the method in the first aspect or the method in the second aspect.

According to a sixth aspect, a terminal is provided, including a processor and a communication interface, where the communication interface is configured to receive a sidelink discontinuous reception command media access control control element SL DRX command MAC CE sent by a second terminal, where the SL DRX command MAC CE carries a valid object and/or a range of the SL DRX command MAC CE; and the processor is configured to perform a first operation according to the valid object and/or range of the SL DRX command MAC CE.

According to a seventh aspect, a terminal is provided, including a processor and a communication interface, where the communication interface is configured to send a sidelink discontinuous reception command media access control control element SL DRX command MAC CE to a first terminal, where the SL DRX command MAC CE carries a valid object and/or a range of the SL DRX command MAC CE.

According to an eighth aspect, a readable storage medium is provided. The readable storage medium stores a program or an instruction, and when the program or the instruction is executed by a processor, the steps of the method in the first aspect or the steps of the method in the second aspect are implemented.

According to a ninth aspect, a chip is provided. The chip includes a processor and a communications interface, the communications interface is coupled to the processor, and the processor is configured to run a program or an instruction to implement the method in the first aspect or the method in the second aspect.

According to a tenth aspect, a computer program/program product is provided, the computer program/program product is stored in a non-volatile storage medium, and the program/program product is executed by at least one processor to implement the steps of the sidelink discontinuous reception implementation method as described in the first aspect, or implement the steps of the sidelink discontinuous reception implementation method as described in the second aspect.

DETAILED DESCRIPTION

The following clearly describes technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application shall fall within the protection scope of this application.

The terms "first", "second", and the like in this specification and claims of this application are used to distinguish between similar objects instead of describing a specific order or sequence. It should be understood that the terms used in such a way is interchangeable in proper circumstances, so that the embodiments of this application can be implemented in an order other than the order illustrated or described herein. Objects classified by "first" and "second" are usually of a same type, and the number of objects is not limited. For example, there may be one or more first objects. In addition, in the description and the claims, "and/or" represents at least one of connected objects, and a character "/" generally represents an "or" relationship between associated objects.

It should be noted that, the technologies described in the embodiments of this application are not limited to a Long Term Evolution (LTE)/LTE-Advanced (LTE-A) system, and can also be used in other wireless communication systems such as Code Division Multiple Access (CDMA), Time Division Multiple Access (TDMA), Frequency Division Multiple Access (FDMA), Orthogonal Frequency Division Multiple Access (OFDMA), Single-carrier Frequency-Division Multiple Access (SC-FDMA), and another system. The terms "system" and "network" in the embodiments of this application may be used interchangeably. The technologies described can be applied to both the systems and the radio technologies mentioned above as well as to other systems and radio technologies. The following descriptions describe a new radio (NR) system for example purposes, and NR terms are used in most of the following descriptions, but these technologies can also be applied to an application other than an NR system application, for example, a 6th generation (6G) communication system.

Figure 3:
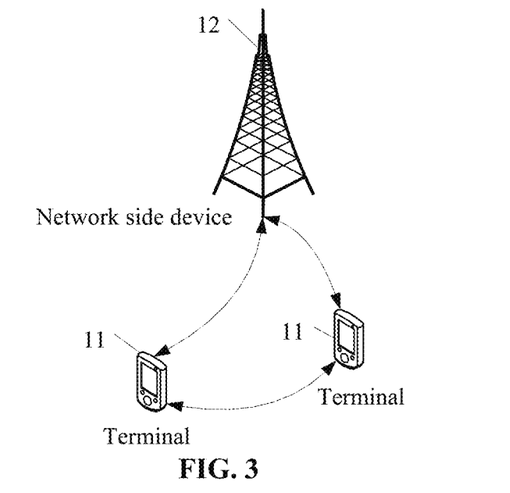
FIG. 3 is a block diagram of a wireless communications system to which an embodiment of this application is applicable.

FIG. 3 is a block diagram of a wireless communications system to which an embodiment of this application can be applied. The wireless communications system includes a terminal 11 and a network side device 12. The terminal 11 may also be called a terminal device or user equipment (UE), and the terminal 11 may be a mobile phone, a tablet personal computer, a laptop computer or a notebook computer, a personal digital Assistant (PDA), a palmtop computer, a netbook, an ultra-mobile personal computer (UMPC), a mobile Internet device (MID), a wearable device or a vehicle-mounted device (VUE), a pedestrian terminal (PUE), and other terminal side devices. The wearable device includes: smart watches, bracelets, earphones, glasses, etc. It should be noted that a specific type of the terminal 11 is not limited in this embodiment of this application. The network side device 12 may be a base station or a core network. The base station may be referred to as a node B, an evolved node B, an access point, a base transceiver station (BTS), a radio base station, a radio transceiver, a basic service set (BSS), an extended service set (ESS), a node B, an evolved node B (eNB), a home node B, a home evolved node B, a WLAN access point, a WiFi node, a transmitting receiving point (TRP), or other appropriate terms in the art. As long as a same technical effect is achieved, the base station is not limited to a specified technical term. It should be noted that, in embodiments of this application, only a base station in the NR system is used as an example, but a specific type of the base station is not limited.

Figure 4:
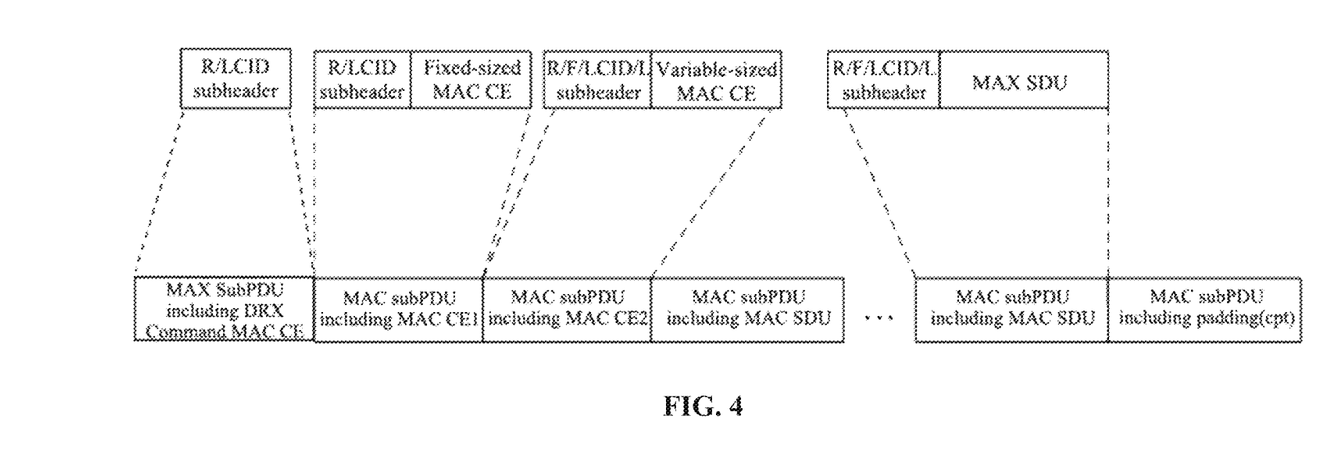
FIG. 4 is a schematic diagram of a downlink MAC protocol data unit PDU in the related art.

The format design of the Uu DRX command MAC CE in the related art is very simple. As shown in FIG. 4, the DRX command MAC CE only has a MAC subheader, and the control granularity of the Uu DRX command MAC CE is per UE. Considering that UE may perform multiple unicast/multicast services at the same time in SL scenarios, and UE may establish multiple unicast connections/multicast groups at the same time, the format of the Uu DRX command MAC CE at a per UE granularity is less flexible and is not suitable for the DRX mechanism in SL scenarios. In order to solve the above problems, embodiments of this application provide an implementation method and apparatus for sidelink discontinuous reception and a terminal.

The sidelink discontinuous reception implementation method and apparatus and the terminal provided by the embodiments of this application are described in detail below through some embodiments and application scenarios with reference to the accompanying drawings.

Figure 5:
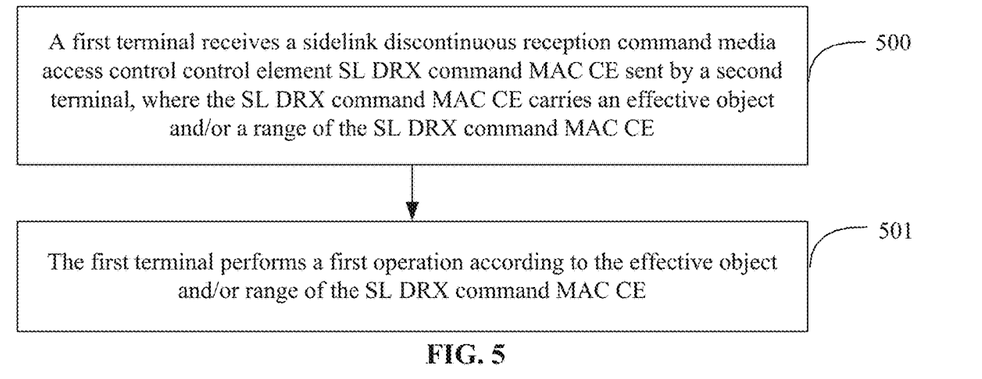
FIG. 5 is a schematic flowchart 1 of an implementation method for sidelink discontinuous reception provided by an embodiment of this application.

FIG. 5 is a schematic flowchart 1 of an implementation method for sidelink discontinuous reception provided by an embodiment of this application. As shown in FIG. 5, the method includes:

Step 500: A first terminal receives a sidelink discontinuous reception command media access control control element SL DRX command MAC CE sent by a second terminal, where the SL DRX command MAC CE carries a valid object and/or a range of the SL DRX command MAC CE.

It should be noted that both the first terminal and the second terminal are SL terminals. The first terminal is a receiving end, and the second terminal is a sending end.

That the SL DRX command MAC CE carries the valid object and/or range of the SL DRX command MAC CE refers to that the SL DRX command MAC CE indicates objects and/or ranges for which the SL DRX command MAC CE is valid.

Step 501: The first terminal performs a first operation according to the valid object and/or range of the SL DRX command MAC CE.

Optionally, the first terminal receives the SL DRX command MAC CE, acquires the valid object and/or range of the SL DRX command MAC CE, and then performs the first operation according to the valid object and/or range of the SL DRX command MAC CE. For example, according to the valid object and/or range of the SL DRX command MAC CE, the operation of the relevant SL DRX timer is stopped.

In the embodiments of this application, the SL DRX command MAC CE received by the terminal carries the valid object and/or range of the SL DRX command MAC CE. Since the granularity of the valid object and/or range is finer, it can further improve the flexibility of SL DRX power saving control while meeting the power saving purpose of SL UE.

Optionally, the format of the SL DRX command MAC CE includes:

Format 1: only including a MAC CE subheader and not including a MAC CE payload.

Figure 6:
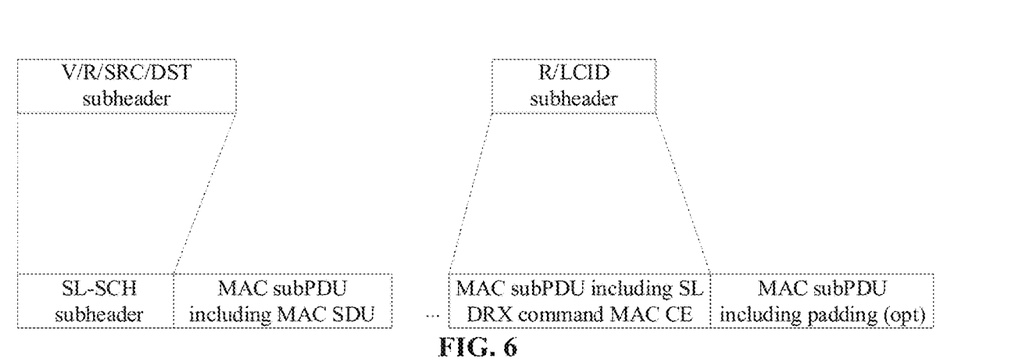
FIG. 6 is a schematic diagram of an SL DRX command MAC CE (Format 1) provided by an embodiment of this application.

FIG. 6 is a schematic diagram of an SL DRX command MAC CE (Format 1) provided by an embodiment of this application. Optionally, on the premise of format 1, the MAC CE subheader includes a padding R field and a logical channel identifier LCID field, where the LCID field is used to indicate the format of the SL DRX command MAC CE.

Format 2: including a MAC CE subheader and a MAC CE payload.

Figure 7:
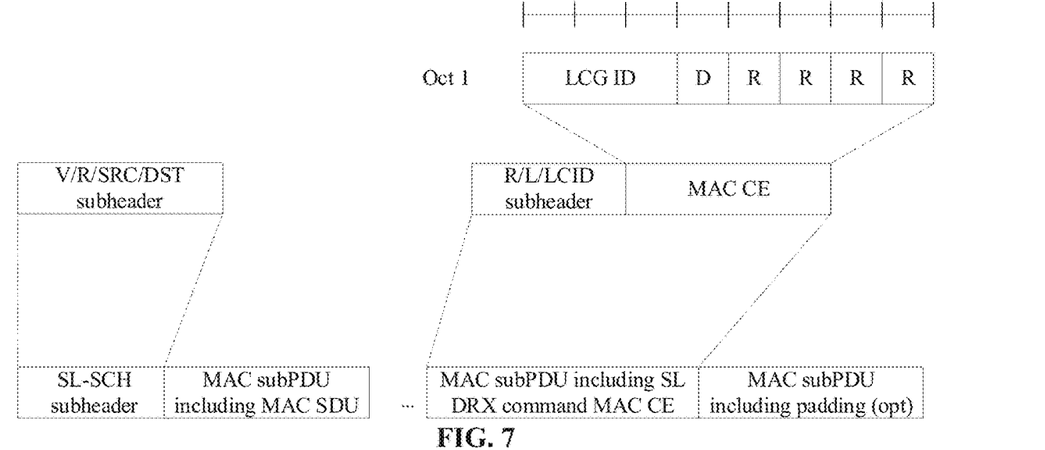
FIG. 7 is a schematic diagram of an SL DRX command MAC CE (Format 2) provided by an embodiment of this application.

FIG. 7 is a schematic diagram of an SL DRX command MAC CE (Format 2) provided by an embodiment of this application. Optionally, on the premise of format 2, the MAC CE subheader includes a padding R field, a length L field, and a logical channel identification LCID field, where the L field is used to indicate the number of bytes occupied by the MAC CE payload, and the LCID field is used to indicate the format of the SL DRX command MAC CE.

It should be noted that, in format 1 and format 2, the R field is a padding field. The MAC CE payload can include 0, 1 or more R fields, depending on whether BYTE is aligned after all the information is arranged, and the R fields are used to fill according to the number of missing bits.

Optionally, the valid object and/or range of the SL DRX command MAC CE is indicated by one of the following methods:

in a case that the format of the SL DRX command MAC CE is format 1, all information about the valid object and/or range of the SL DRX command MAC CE is indicated by at least one of sidelink control information (SCI) and a sidelink shared channel (SL-SCH) subheader;

in a case that the format of the SL DRX command MAC CE is format 2, all information about the valid object and/or range of the SL DRX command MAC CE is indicated by a MAC CE payload; and in a case that the SL DRX command MAC CE adopts format 2, the first part of information about the valid object and/or range of the SL DRX command MAC CE is indicated by at least one of the SCI and SL-SCH subheader, and the second part of information about the valid object and/or range of the SL DRX command MAC CE is indicated by the MAC CE payload.

Optionally, on the premise that the format of the SL DRX command MAC CE is format 1, all information about the valid object and/or range of the SL DRX command MAC CE is implicitly indicated by at least one of the SCI and the sidelink shared channel SL-SCH subheader. That is, the terminal acquires all the information about the valid object and/or range of the SL DRX command MAC CE through at least one of the SCI and the sidelink shared channel SL-SCH subheader.

Optionally, the indication by at least one of the SCI and SL-SCH subheader includes at least one of the following:
  indicated by a source address identifier carried in the SCI;
  indicated by a destination address identifier carried in the SCI;
  indicated by a source address field carried in the SL-SCH subheader; and
  indicated by a destination address field carried in the SL-SCH subheader.

It can be understood that the valid object and/or scope of the SL DRX command MAC CE is a combination of the following information: the source address identifier carried in the SCI; the destination address identifier carried in the SCI; the source address field carried in the SL-SCH subheader; and the destination address field carried in the SL-SCH subheader.

The source L2 ID provided by the upper layer to the access stratum (AS) has a total of 24 bits, which are split into the lower 8 bits and the upper 16 bits at the AS layer. The lower 8 bits of the Source L2 ID are assigned to the source address identifier (Source ID) carried in the SCI; and the upper 16 bits of the Source L2 ID are assigned to the source address field (SRC field) carried in the SL-SCH subheader.

The destination L2 ID provided by the upper layer to the AS layer has a total of 24 bits, which are split into the lower 16 bits and the upper 8 bits at the AS layer. The lower 16 bits of the destination L2 ID are assigned to the destination address identifier (Destination ID) carried in the SCI; and the upper 8 bits of the destination L2 ID are assigned to the destination address field (DST field) carried in the SL-SCH subheader.

In the embodiment of this application, the upper layer refers to a vehicle to everything (V2X) layer or a proximity service (ProSe) layer or an application layer.

Optionally, in a case that the format of the SL DRX command MAC CE is format 2, all information about the valid object and/or range of the SL DRX command MAC CE is explicitly indicated by a MAC CE payload. That is, the terminal acquires all the information about the valid object and/or range of the SL DRX command MAC CE through the MAC CE payload.

Optionally, the MAC CE payload carries at least one of the following information:
- destination information, where each bit of the index or BitMap of the destination information corresponds to a first upper layer ID; where
The first upper layer ID is the destination L2 ID provided by the upper layer to the AS layer, and may be a destination UE ID or a destination group ID.
- source address information, where each bit of an index or a BitMap of the source information corresponds to a second upper layer ID;
- where the second upper layer ID is equal to the source L2 ID provided by the upper layer to the AS layer;
- at least one logical channel identifier LCD or logical channel group LCG information;
- cast type information;
- where the cast type information includes at least one of unicast and multicast;
- SL DRX configuration information, where each bit of an index or a BitMap of the SL DRX configuration information corresponds to a set of SL DRX parameters, and the set of SL DRX parameters are obtained through broadcast configuration or dedicated signaling configuration or second terminal configuration or pre-configuration;
- where optionally, a set of SL DRX parameters may include at least one of the following parameters: drx-onDurationTimer, drx-InactivityTimer, drx-RetransmissionTimer, drx-HARQ-RTT-Timer, and drx-Cycle, DRX-CycleStartOffset;
- sidelink process SL process information, where each bit of an index or a BitMap of the SL process information corresponds to an SL process ID;
- validity period information, where the validity period information is used to indicate the valid time of the SL DRX Command MAC CE;
- where a unit of the validity period information may be ms, DRX cycle, subframe, or slot; and
- direction information, where the direction information is used to indicate an active direction in which the SL DRX Command MAC CE activates/deactivates DRX.

For example, for a pair of unicast UE1 and UE2, Direction=0 indicates the sending direction of UE1→UE2; and Direction=1 indicates the sending direction of UE2→UE1. The direction information is applicable to the scenario where common DRX is applied to a pair of unicast UEs.

Referring to FIG. 7, for example, the logical channel group LCG information and direction information are carried in the MAC CE payload, and it indicates the valid object and/or range of the SL DRX command MAC CE. In fact, the information carried in the MAC CE payload may be a combination of various information, and the invention does not limit the arrangement order of various information.

In some optional embodiments, when the SL DRX command MAC CE adopts format 2, the valid object and/or range of the SL DRX command MAC CE may also be indicated by at least one of the SCI and SL-SCH subheader:

The first part of information about the valid object and/or range of the SL DRX command MAC CE is implicitly indicated by at least one of the SCI and SL-SCH subheader, and the second part of information about the valid object and/or range of the SL DRX command MAC CE is explicitly indicated by the MAC CE payload.

Optionally, the terminal acquires the first part of information about the valid object and/or range of the SL DRX command MAC CE through at least one of the SCI and the SL-SCH subheader, and acquires the second part of information about the valid object and/or range of the SL DRX command MAC CE through the MAC CE payload.

The first part of information and the second part of information constitute all information of the valid object and/or range of the SL DRX command MAC CE.

For implicit indication of the first part of information through at least one of the SCI and SL-SCH subheader, refer to the implicit indication through at least one of the SCI and SL-SCH subheader in the case that the SL DRX command MAC CE adopts format 1, and details are not repeated here.

For explicit indication of the second part of information through the MAC CE payload, refer to the explicit indication through the MAC CE payload when the SL DRX command MAC CE adopts format 2, and details are not repeated here. It should be noted that in this case, the information carried in the MAC CE payload may not include destination information and source information, or may include destination information and source information that are different from those implicitly indicated by at least one of the SCI and SL-SCH subheader.

Optionally, after receiving the SL DRX command MAC CE, the first terminal performs a first operation according to the valid object and/or range of the SL DRX command MAC CE, and the performing the first operation includes at least one of the following:
- stopping an SL DRX timer related to the valid object and/or range;
- in a case that the valid object and/or range includes validity period information, starting the SL DRX command MAC CE validity period timer, and after the SL DRX command MAC CE validity period timer expires, starting the SL DRX timer related to the valid object and/or range;
- and in a case that the valid object and/or range includes SL DRX configuration information, starting, according to the SL DRX configuration information, an SL DRX timer related to the valid object and/or range.

In the prior art, when the UE receives the DRX command MAC CE from the base station, it stops running a DRX timer related to the UE, such as drx-onDurationTimer and drx-InactivityTimer. Different from the prior art, in the embodiment of this application, the first terminal stops the SL DRX timer related to the valid object and/or range, so as to realize finer-grained control and improve the flexibility of SL DRX power saving control.

Figure 8:
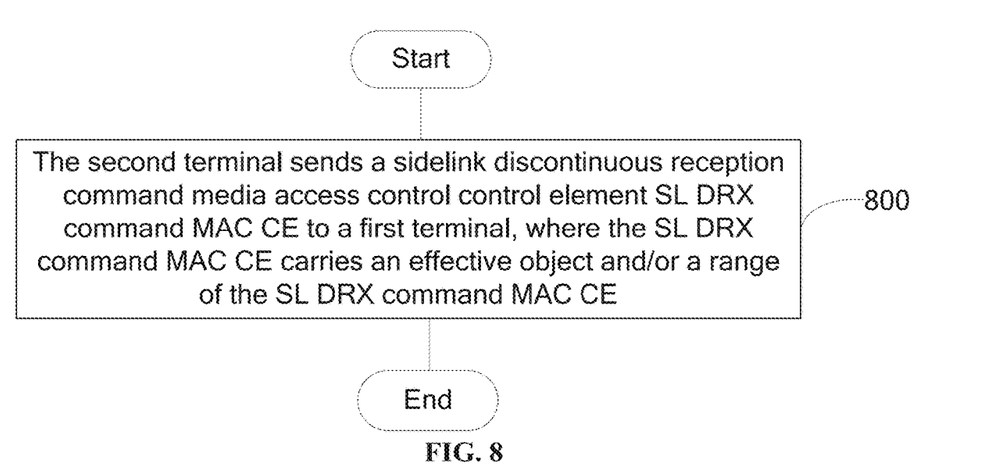
FIG. 8 is a schematic flowchart 2 of an implementation method for sidelink discontinuous reception provided by an embodiment of this application.

FIG. 8 is a schematic flowchart 2 of an implementation method for sidelink discontinuous reception provided by an embodiment of this application. As shown in FIG. 8, the method includes the following steps:

Step 800: A second terminal sends a sidelink discontinuous reception command media access control control element SL DRX command MAC CE to a first terminal, where the SL DRX command MAC CE carries a valid object and/or a range of the SL DRX command MAC CE.

It should be noted that both the first terminal and the second terminal are SL terminals. The first terminal is a receiving end, and the second terminal is a sending end.

That the SL DRX command MAC CE carries the valid object and/or range of the SL DRX command MAC CE refers to that the SL DRX command MAC CE indicates, to the first terminal, objects and/or ranges for which the SL DRX command MAC CE is valid.

In the embodiments of this application, the SL DRX command MAC CE sent by the sending end to the receiving end carries the valid object and/or range of the SL DRX command MAC CE. Since the granularity of the valid object and/or range is finer, it can further improve the flexibility of SL DRX power saving control while meeting the power saving purpose of SL UE.

Optionally, the format of the SL DRX command MAC CE includes:
Format 1: only including a MAC CE subheader and not including a MAC CE payload; or
Format 2: including a MAC CE subheader and a MAC CE payload.

Optionally, when the format of the SL DRX command MAC CE is format 1, the MAC CE subheader includes a padding R field and a logical channel identifier LCID field, where the LCID field is used to indicate the format of the SL DRX command MAC CE.

When the format of the SL DRX command MAC CE is format 2, the MAC CE subheader includes a padding R field, a length L field, and a logical channel identification LCID field, where the L field is used to indicate the number of bytes occupied by the MAC CE payload, and the LCID field is used to indicate the format of the SL DRX command MAC CE.

Optionally, the valid object and/or range of the SL DRX command MAC CE is indicated by one of the following methods:
in a case that the format of the SL DRX command MAC CE is format 1, all information about the valid object and/or range of the SL DRX command MAC CE is indicated by at least one of the sidelink control information SCI and the sidelink shared channel SL-SCH subheader;
in a case that the format of the SL DRX command MAC CE is format 2, all information about the valid object and/or range of the SL DRX command MAC CE is indicated by a MAC CE payload; and
in a case that the SL DRX command MAC CE adopts format 2, the first part of information about the valid object and/or range of the SL DRX command MAC CE is indicated by at least one of the SCI and SL-SCH subheader, and the second part of information about the valid object and/or range of the SL DRX command MAC CE is indicated by the MAC CE payload.

Optionally, the indication by at least one of the SCI and SL-SCH subheader includes at least one of the following:
indicated by a source address identifier carried in the SCI;
indicated by a destination address identifier carried in the SCI;
indicated by a source address field carried in the SL-SCH subheader; and
indicated by a destination address field carried in the SL-SCH subheader.

Optionally, the indication through the MAC CE payload includes:
the MAC CE payload carries at least one of the following information:
destination information, where each bit of the index or BitMap of the destination information corresponds to a first upper layer ID; where
source address information, where each bit of an index or a BitMap of the source information corresponds to a second upper layer ID;
at least one logical channel identifier LCD or logical channel group LCG information;
cast type information;
SL DRX configuration information, where each bit of an index or a BitMap of the SL DRX configuration information corresponds to a set of SL DRX parameters, and the set of SL DRX parameters are obtained through broadcast configuration or dedicated signaling configuration or second terminal configuration or pre-configuration;
sidelink process SL process information, where each bit of an index or a BitMap of the SL process information corresponds to an SL process ID;
validity period information, where the validity period information is used to indicate the valid time of the SL DRX Command MAC CE; and
direction information, where the direction information is used to indicate an active direction in which the SL DRX Command MAC CE activates/deactivates DRX.

The embodiment of this application is described from the perspective of the sending end, and therefore, reference may be made to the description of the embodiment of the sidelink discontinuous reception implementation method shown in FIG. 5, and details are not repeated here.

It should be noted that, for the sidelink discontinuous reception implementation method provided in the embodiment of this application, the execution body may be the sidelink discontinuous reception implementation apparatus, or a control module configured to execute the sidelink discontinuous reception implementation method in the sidelink discontinuous reception implementation apparatus. In the embodiment of this application, the sidelink discontinuous reception implementation method being performed by the sidelink discontinuous reception implementation apparatus is taken as an example to illustrate sidelink discontinuous reception implementation apparatus.

Figure 9:
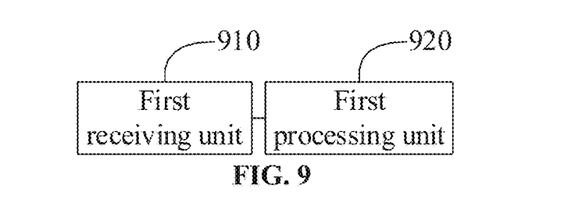
FIG. 9 is a schematic structural diagram 1 of an implementation apparatus for sidelink discontinuous reception provided by an embodiment of this application.

FIG. 9 is a schematic structural diagram 1 of an implementation apparatus for sidelink discontinuous reception provided by an embodiment of this application. As shown in FIG. 9, the apparatus includes:
a first receiving unit 910, configured to receive a sidelink discontinuous reception command media access control control element SL DRX command MAC CE sent by a second terminal, where the SL DRX command MAC CE carries a valid object and/or a range of the SL DRX command MAC CE; and a first processing unit 920, configured to perform a first operation according to the valid object and/or range of the SL DRX command MAC CE.

Optionally, the format of the SL DRX command MAC CE includes:
Format 1: only including a MAC CE subheader and not including a MAC CE payload; or
Format 2: including a MAC CE subheader and a MAC CE payload.

Optionally, when the format of the SL DRX command MAC CE is format 1, the MAC CE subheader includes a padding R field and a logical channel identifier LCID field, where the LCID field is used to indicate the format of the SL DRX command MAC CE.

When the format of the SL DRX command MAC CE is format 2, the MAC CE subheader includes a padding R field, a length L field, and a logical channel identification LCID field, where the L field is used to indicate the number of bytes occupied by the MAC CE payload, and the LCID field is used to indicate the format of the SL DRX command MAC CE.

Optionally, the valid object and/or range of the SL DRX command MAC CE is indicated by one of the following methods:
in a case that the format of the SL DRX command MAC CE is format 1, all information about the valid object and/or range of the SL DRX command MAC CE is indicated by at least one of the sidelink control information SCI and the sidelink shared channel SL-SCH subheader;

in a case that the format of the SL DRX command MAC CE is format 2, all information about the valid object and/or range of the SL DRX command MAC CE is indicated by a MAC CE payload; and in a case that the SL DRX command MAC CE adopts format 2, the first part of information about the valid object and/or range of the SL DRX command MAC CE is indicated by at least one of the SCI and SL-SCH subheader, and the second part of information about the valid object and/or range of the SL DRX command MAC CE is indicated by the MAC CE payload.

Optionally, the indication by at least one of the SCI and SL-SCH subheader includes at least one of the following:
  indicated by a source address identifier carried in the SCI;
  indicated by a destination address identifier carried in the SCI;
  indicated by a source address field carried in the SL-SCH subheader; and
  indicated by a destination address field carried in the SL-SCH subheader.

Optionally, the indication through the MAC CE payload includes:
  the MAC CE payload carries at least one of the following information:
  destination information, where each bit of the index or BitMap of the destination information corresponds to a first upper layer ID; where
  source address information, where each bit of an index or a BitMap of the source information corresponds to a second upper layer ID;
  at least one logical channel identifier LCD or logical channel group LCG information;
  cast type information;
  SL DRX configuration information, where each bit of an index or a BitMap of the SL DRX configuration information corresponds to a set of SL DRX parameters, and the set of SL DRX parameters are obtained through broadcast configuration or dedicated signaling configuration or second terminal configuration or pre-configuration;
  sidelink process SL process information, where each bit of an index or a BitMap of the SL process information corresponds to an SL process ID;
  validity period information, where the validity period information is used to indicate the valid time of the SL DRX Command MAC CE; and
  direction information, where the direction information is used to indicate an active direction in which the SL DRX Command MAC CE activates/deactivates DRX.

Optionally, the first processing unit is configured to perform at least one of the following:
  stopping an SL DRX timer related to the valid object and/or range;
  in a case that the valid object and/or range includes validity period information, starting the SL DRX command MAC CE validity period timer, and after the SL DRX command MAC CE validity period timer expires, starting the SL DRX timer related to the valid object and/or range; and in a case that the valid object and/or range includes SL DRX configuration information, starting, according to the SL DRX configuration information, an SL DRX timer related to the valid object and/or range.

In the embodiments of this application, the SL DRX command MAC CE carries the valid object and/or range of the SL DRX command MAC CE. Since the granularity of the valid object and/or range is finer, it can further improve the flexibility of SL DRX power saving control while meeting the power saving purpose of SL UE.

The sidelink discontinuous reception implementation apparatus in the embodiment of this application may be an apparatus, an apparatus with an operating system or an electronic device, or a component, an integrated circuit, or a chip in a terminal. The apparatus or electronic device may be a mobile terminal or a non-mobile terminal. For example, the mobile terminal may include but is not limited to the types of the foregoing listed terminal 11, and the non-mobile terminal may be a server, a network attached storage (NAS), a personal computer (PC), a television (TV), an automated teller machine, or a self-service machine. This is not specifically limited in this embodiment of this application.

The sidelink discontinuous reception implementation apparatus according to an embodiments of the present disclosure can implement the processes in the method embodiments in FIG. 5 to FIG. 7, and achieve the same technical effect. To avoid duplication, details are not described herein again.

Figure 10:
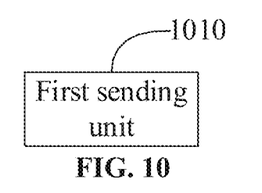
FIG. 10 is a schematic structural diagram 2 of an implementation apparatus for sidelink discontinuous reception provided by an embodiment of this application.

FIG. 10 is a schematic structural diagram 2 of an implementation apparatus for sidelink discontinuous reception provided by an embodiment of this application. As shown in FIG. 10, the apparatus includes:
  a first sending unit 1010, configured to send a sidelink discontinuous reception command media access control control element SL DRX command MAC CE to a first terminal, where the SL DRX command MAC CE carries a valid object and/or a range of the SL DRX command MAC CE. Optionally, the format of the SL DRX command MAC CE includes:
  Format 1: only including a MAC CE subheader and not including a MAC CE payload; or
  Format 2: including a MAC CE subheader and a MAC CE payload.

Optionally, when the format of the SL DRX command MAC CE is format 1, the MAC CE subheader includes a padding R field and a logical channel identifier LCD field, where the LCID field is used to indicate the format of the SL DRX command MAC CE.

When the format of the SL DRX command MAC CE is format 2, the MAC CE subheader includes a padding R field, a length L field, and a logical channel identification LCID field, where the L field is used to indicate the number of bytes occupied by the MAC CE payload, and the LCID field is used to indicate the format of the SL DRX command MAC CE.

Optionally, the valid object and/or range of the SL DRX command MAC CE is indicated by one of the following methods:
  in a case that the format of the SL DRX command MAC CE is format 1, all information about the valid object and/or range of the SL DRX command MAC CE is indicated by at least one of the sidelink control information SCI and the sidelink shared channel SL-SCH subheader;
  in a case that the format of the SL DRX command MAC CE is format 2, all information about the valid object and/or range of the SL DRX command MAC CE is indicated by a MAC CE payload; and
  in a case that the SL DRX command MAC CE adopts format 2, the first part of information about the valid object and/or range of the SL DRX command MAC CE is indicated by at least one of the SCI and SL-SCH subheader, and the second part of information about the valid object and/or range of the SL DRX command MAC CE is indicated by the MAC CE payload.

Optionally, the indication by at least one of the SCI and SL-SCH subheader includes at least one of the following:
  indicated by a source address identifier carried in the SCI;
  indicated by a destination address identifier carried in the SCI;
  indicated by a source address field carried in the SL-SCH subheader; and
  indicated by a destination address field carried in the SL-SCH subheader.

Optionally, the indication through the MAC CE payload includes:
  the MAC CE payload carries at least one of the following information:
  destination information, where each bit of the index or BitMap of the destination information corresponds to a first upper layer ID; where
  source address information, where each bit of an index or a BitMap of the source information corresponds to a second upper layer ID;
  at least one logical channel identifier LCID or logical channel group LCG information;
  cast type information;
  SL DRX configuration information, where each bit of an index or a BitMap of the SL DRX configuration information corresponds to a set of SL DRX parameters, and the set of SL DRX parameters are obtained through broadcast configuration or dedicated signaling configuration or second terminal configuration or pre-configuration;
  sidelink process SL process information, where each bit of an index or a BitMap of the SL process information corresponds to an SL process ID;
  validity period information, where the validity period information is used to indicate the valid time of the SL DRX Command MAC CE; and
  direction information, where the direction information is used to indicate an active direction in which the SL DRX Command MAC CE activates/deactivates DRX.

In the embodiments of this application, the SL DRX command MAC CE carries the valid object and/or range of the SL DRX command MAC CE. Since the granularity of the valid object and/or range is finer, it can further improve the flexibility of SL DRX power saving control while meeting the power saving purpose of SL UE.

The sidelink discontinuous reception implementation apparatus in the embodiment of this application may be an apparatus, an apparatus with an operating system or an electronic device, or a component, an integrated circuit, or a chip in a terminal. The apparatus or electronic device may be a mobile terminal or a non-mobile terminal. For example, the mobile terminal may include but is not limited to the types of the foregoing listed terminal 11, and the non-mobile terminal may be a server, a network attached storage (NAS), a personal computer (PC), a television (TV), an automated teller machine, or a self-service machine. This is not specifically limited in this embodiment of this application.

The sidelink discontinuous reception implementation apparatus according to an embodiments of the present disclosure can implement the processes in the method embodiments in FIG. 8, and achieve the same technical effect. To avoid duplication, details are not described herein again.

Figure 11:
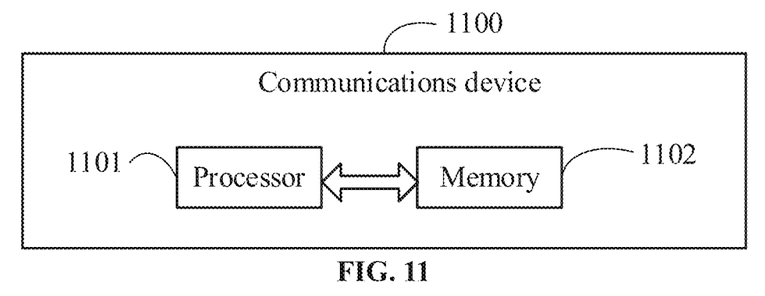
FIG. 11 is a schematic structural diagram of a communications device according to an embodiment of this application.

Optionally, as shown in FIG. 11, an embodiment of this application further provides a communication device 1100, including a processor 1101, a memory 1102, and a program or an instruction stored in the memory 1102 and executable on the processor 1101. For example, when the communication device 1100 is a terminal, when the program or instruction is executed by the processor 1101, each process of the embodiment of the foregoing sidelink discontinuous reception implementation method is performed, and the same technical effect can be achieved. To avoid repetition, details are not described herein again.

Optionally, an embodiment of this application further provides a terminal, including a processor and a communication interface, where the communication interface is configured to receive a sidelink discontinuous reception command media access control control element SL DRX command MAC CE sent by a second terminal the SL DRX command MAC CE carries a valid object and/or a range of the SL DRX command MAC CE; and the processor is configured to perform a first operation according to the valid object and/or range of the SL DRX command MAC CE. This terminal embodiment corresponds to the above-mentioned method embodiment on the terminal side, and each implementation process and implementation manner of the above-mentioned method embodiment can be applied to this terminal embodiment, and can achieve the same technical effect.

Optionally, the embodiment of this application further provides a terminal, including a processor and a communication interface, where the communication interface is configured to send a sidelink discontinuous reception command media access control control element SL DRX command MAC CE to a first terminal, where the SL DRX command MAC CE carries a valid object and/or a range of the SL DRX command MAC CE. This terminal embodiment corresponds to the above-mentioned method embodiment on the terminal side, and each implementation process and implementation manner of the above-mentioned method embodiment can be applied to this terminal embodiment, and can achieve the same technical effect.

Figure 12:
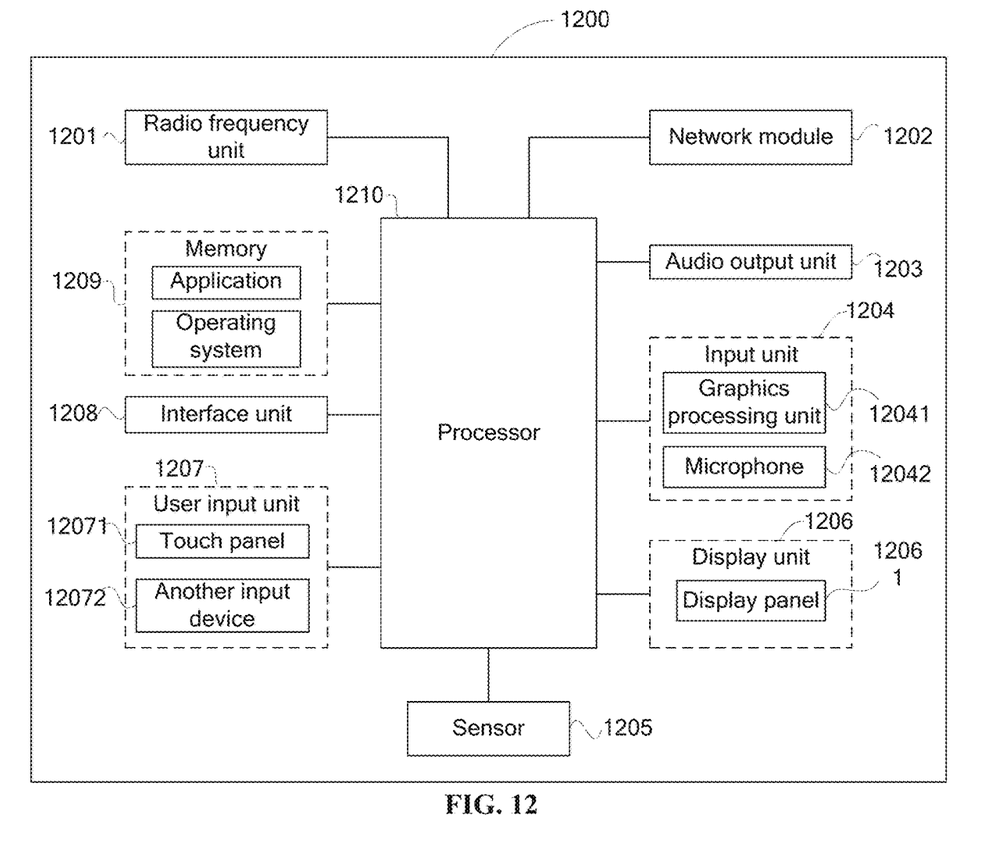
FIG. 12 is a schematic diagram of a hardware structure of a terminal according to an embodiment of this application.

Specifically, FIG. 12 is a schematic diagram of a hardware structure of a terminal provided by an embodiment of this application.

A terminal 1200 includes but is not limited to at least a part of components such as a radio frequency unit 1201, a network module 1202, an audio output unit 1203, an input unit 1204, a sensor 1205, a display unit 1206, a user input unit 1207, an interface unit 1208, a memory 1209, and a processor 1210.

A person skilled in the art can understand that the terminal 1200 may further include a power supply (such as a battery) that supplies power to each component. The power supply may be logically connected to the processor 1210 by using a power supply management system, to implement functions such as charging and discharging management, and power consumption management by using the power supply management system. The terminal structure shown in FIG. 12 constitutes no limitation on the terminal, and the terminal may include more or fewer components than those shown in the figure, or combine some components, or have different component arrangements. Details are not described herein.

It should be understood that, in this embodiment of this application, the input unit 1204 may include a graphics processing unit (GPU) 12041 and a microphone 12042, and the graphics processing unit 12041 processes image data of a still picture or a video obtained by an image capture apparatus (such as a camera) in a video capture mode or an image capture mode. The display unit 1206 may include a display panel 12061. Optionally, the display panel 12061 may be configured in a form such as a liquid crystal display or an organic light-emitting diode. The user input unit 1207 includes a touch panel 12071 and another input device 12072. The touch panel 12071 is also referred to as a touchscreen. The touch panel 12071 may include two parts: a touch detection apparatus and a touch controller. The another input device 12072 may include but is not limited to a physical keyboard, a functional button (such as a volume control button or a power on/off button), a trackball, a mouse, and a joystick. Details are not described herein.

In this embodiment of this application, the radio frequency unit 1201 receives downlink data from a network side device and then sends the downlink data to the processor 1210 for processing; and sends uplink data to the network side device. Usually, the radio frequency unit 1201 includes but is not limited to an antenna, at least one amplifier, a transceiver, a coupler, a low noise amplifier, a duplexer, and the like.

The memory 1209 may be configured to store a software program or an instruction and various data. The memory 1209 may mainly include a storage program or instruction area and a storage data area, where the storage program or instruction area may store an operating system, an application program or an instruction required by at least one function (such as a sound play function or an image play function), and the like. In addition, the memory 1209 may include a high-speed random access memory, and may further include a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory, for example, at least one disk storage device, a flash memory device, or another non-volatile solid-state storage device.

The processor 1210 may include one or more processing units. Optionally, an application processor and a modem processor may be integrated into the processor 1210. The application processor mainly processes an operating system, a user interface, an application, an instruction, or the like. The modem processor mainly processes wireless communications, for example, a baseband processor. It can be understood that, alternatively, the modem processor may not be integrated into the processor 1210.

The radio frequency unit 1201 is configured to receive a sidelink discontinuous reception command media access control control element SL DRX command MAC CE sent by a second terminal, where the SL DRX command MAC CE carries a valid object and/or a range of the SL DRX command MAC CE.

The processor 1210 is configured to perform a first operation according to the valid object and/or range of the SL DRX command MAC CE.

Optionally, the format of the SL DRX command MAC CE includes:
  Format 1: only including a MAC CE subheader and not including a MAC CE payload; or
  Format 2: including a MAC CE subheader and a MAC CE payload.

Optionally, when the format of the SL DRX command MAC CE is format 1, the MAC CE subheader includes a padding R field and a logical channel identifier LCID field, where the LCID field is used to indicate the format of the SL DRX command MAC CE.

When the format of the SL DRX command MAC CE is format 2, the MAC CE subheader includes a padding R field, a length L field, and a logical channel identification LCID field, where the L field is used to indicate the number of bytes occupied by the MAC CE payload, and the LCID field is used to indicate the format of the SL DRX command MAC CE.

Optionally, the valid object and/or range of the SL DRX command MAC CE is indicated by one of the following methods:
  in a case that the format of the SL DRX command MAC CE is format 1, all information about the valid object and/or range of the SL DRX command MAC CE is indicated by at least one of the sidelink control information SCI and the sidelink shared channel SL-SCH subheader;
  in a case that the format of the SL DRX command MAC CE is format 2, all information about the valid object and/or range of the SL DRX command MAC CE is indicated by a MAC CE payload; and
  in a case that the SL DRX command MAC CE adopts format 2, the first part of information about the valid object and/or range of the SL DRX command MAC CE is indicated by at least one of the SCI and SL-SCH subheader, and the second part of information about the valid object and/or range of the SL DRX command MAC CE is indicated by the MAC CE payload.

Optionally, the indication by at least one of the SCI and SL-SCH subheader includes at least one of the following:
  indicated by a source address identifier carried in the SCI;
  indicated by a destination address identifier carried in the SCI;
  indicated by a source address field carried in the SL-SCH subheader; and
  indicated by a destination address field carried in the SL-SCH subheader.

Optionally, the indication through the MAC CE payload includes:
  the MAC CE payload carries at least one of the following information:
  destination information, where each bit of the index or BitMap of the destination information corresponds to a first upper layer ID; where
  source address information, where each bit of an index or a BitMap of the source information corresponds to a second upper layer ID;
  at least one logical channel identifier LCD or logical channel group LCG information;
  cast type information;
  SL DRX configuration information, where each bit of an index or a BitMap of the SL DRX configuration information corresponds to a set of SL DRX parameters, and the set of SL DRX parameters are obtained through broadcast configuration or dedicated signaling configuration or second terminal configuration or pre-configuration;
  sidelink process SL process information, where each bit of an index or a BitMap of the SL process information corresponds to an SL process ID;
  validity period information, where the validity period information is used to indicate the valid time of the SL DRX Command MAC CE; and
  direction information, where the direction information is used to indicate an active direction in which the SL DRX Command MAC CE activates/deactivates DRX.

Optionally, the processor 1210 is also configured to perform at least one of the following:
  stopping an SL DRX timer related to the valid object and/or range;
  in a case that the valid object and/or range includes validity period information, starting the SL DRX command MAC CE validity period timer, and after the SL DRX command MAC CE validity period timer expires, starting the SL DRX timer related to the valid object and/or range; and in a case that the valid object and/or range includes SL DRX configuration information, starting, according to the SL DRX configuration information, an SL DRX timer related to the valid object and/or range.

In the embodiments of this application, the SL DRX command MAC CE received by the terminal carries the valid object and/or range of the SL DRX command MAC CE. Since the granularity of the valid object and/or range is finer, it can further improve the flexibility of SL DRX power saving control while meeting the power saving purpose of SL UE.

In another optional embodiment, the radio frequency unit 1201 is configured to send a sidelink discontinuous reception command media access control control element SL DRX command MAC CE to a first terminal, where the SL DRX command MAC CE carries a valid object and/or a range of the SL DRX command MAC CE.

Optionally, the format of the SL DRX command MAC CE includes:
Format 1: only including a MAC CE subheader and not including a MAC CE payload; or
Format 2: including a MAC CE subheader and a MAC CE payload.

Optionally, when the format of the SL DRX command MAC CE is format 1, the MAC CE subheader includes a padding R field and a logical channel identifier LCID field, where the LCID field is used to indicate the format of the SL DRX command MAC CE.

When the format of the SL DRX command MAC CE is format 2, the MAC CE subheader includes a padding R field, a length L field, and a logical channel identification LCID field, where the L field is used to indicate the number of bytes occupied by the MAC CE payload, and the LCID field is used to indicate the format of the SL DRX command MAC CE.

Optionally, the valid object and/or range of the SL DRX command MAC CE is indicated by one of the following methods:
in a case that the format of the SL DRX command MAC CE is format 1, all information about the valid object and/or range of the SL DRX command MAC CE is indicated by at least one of the sidelink control information SCI and the sidelink shared channel SL-SCH subheader;
in a case that the format of the SL DRX command MAC CE is format 2, all information about the valid object and/or range of the SL DRX command MAC CE is indicated by a MAC CE payload; and
in a case that the SL DRX command MAC CE adopts format 2, the first part of information about the valid object and/or range of the SL DRX command MAC CE is indicated by at least one of the SCI and SL-SCH subheader, and the second part of information about the valid object and/or range of the SL DRX command MAC CE is indicated by the MAC CE payload.

Optionally, the indication by at least one of the SCI and SL-SCH subheader includes at least one of the following:
indicated by a source address identifier carried in the SCI;
indicated by a destination address identifier carried in the SCI;
indicated by a source address field carried in the SL-SCH subheader; and
indicated by a destination address field carried in the SL-SCH subheader.

Optionally, the indication through the MAC CE payload includes:
the MAC CE payload carries at least one of the following information:
destination information, where each bit of the index or BitMap of the destination information corresponds to a first upper layer ID; where
source address information, where each bit of an index or a BitMap of the source information corresponds to a second upper layer ID;
at least one logical channel identifier LCD or logical channel group LCG information;
cast type information;
SL DRX configuration information, where each bit of an index or a BitMap of the SL DRX configuration information corresponds to a set of SL DRX parameters, and the set of SL DRX parameters are obtained through broadcast configuration or dedicated signaling configuration or second terminal configuration or pre-configuration;
sidelink process SL process information, where each bit of an index or a BitMap of the SL process information corresponds to an SL process ID;
validity period information, where the validity period information is used to indicate the valid time of the SL DRX Command MAC CE; and
direction information, where the direction information is used to indicate an active direction in which the SL DRX Command MAC CE activates/deactivates DRX.

In the embodiments of this application, the SL DRX command MAC CE carries the valid object and/or range of the SL DRX command MAC CE. Since the granularity of the valid object and/or range is finer, it can further improve the flexibility of SL DRX power saving control while meeting the power saving purpose of SL UE.

The embodiment of this application also provides a readable storage medium, the readable storage medium stores a program or an instruction, and when the program or instruction is executed by the processor, each process of the above embodiment of the sidelink discontinuous reception implementation method is implemented, and the same technical effect can be achieved. To avoid repetition, details are not described herein.

The processor is a processor in the terminal in the foregoing embodiment. The readable storage medium includes a computer-readable storage medium, such as a computer read-only memory (ROM), a random access memory (RAM), a magnetic disk, or an optical disc.

An embodiment of this application further provides a chip, the chip includes a processor and a communication interface, the communication interface is coupled to the processor, and the processor is configured to run programs or instructions to implement each process of the embodiment of the foregoing sidelink discontinuous reception implementation method and the same technical effects can be achieved. To avoid repetition, details are not described herein again.

It should be understood that the chip mentioned in this embodiment of this application may also be referred to as a system-level chip, a system chip, a chip system, or an on-chip system chip.

It should be noted that, in this specification, the terms "include", "comprise", or any other variant thereof are intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element limited by "includes a . . . " does not, without more constraints, preclude the presence of additional identical elements in the process, method, article, or apparatus that includes the element. Furthermore, it should be noted that the scope of the methods and apparatuses in the implementations of this application is not limited to performing the functions in the order shown or discussed, but may also include performing the functions in a substantially simultaneous manner or in a reverse order depending on the functions involved. For example, the described methods may be performed in an order different from that described, and various steps may be added, omitted, or combined. In addition, features described with reference to some examples may be combined in other examples.

According to the descriptions of the foregoing implementations, a person skilled in the art may clearly understand that the foregoing method embodiments may be implemented by using software and a required universal hardware platform, or certainly may be implemented by using hardware. However, in many cases, the former is a better implementation. Based on such an understanding, the technical solutions of this application essentially, or the part contributing to the prior art may be implemented in a form of a computer software product. The computer software product is stored in a storage medium (for example, a ROM/RAM, a magnetic disk, or a compact disc), and includes a plurality of instructions for instructing a terminal (which may be a mobile phone, a computer, a server, an air conditioner, a network device, or the like) to perform the method described in the embodiments of this application.

The embodiments of this application are described with reference to the accompanying drawings. However, this application is not limited to the foregoing specific implementations. The foregoing specific implementations are merely examples, but are not limiting. Under the enlightenment of this application, a person of ordinary skill in the art may make many forms without departing from the objective and the scope of the claims of this application, and these forms all fall within the protection scope of this application.

What is claimed is:

1. An implementation method for sidelink discontinuous reception, comprising:
    receiving, by a first terminal, a sidelink discontinuous reception command media access control control element (SL DRX command MAC CE) sent by a second terminal,
    wherein the SL DRX command MAC CE carries a valid object and/or a range of the SL DRX command MAC CE; and
    performing, by the first terminal, a first operation according to the valid object and/or range of the SL DRX command MAC CE;
    wherein when the format of the SL DRX command MAC CE is format 1, the MAC CE subheader comprises
    a padding R field and a logical channel identifier (LCID) field,
    wherein the LCID field is used to indicate the format of the SL DRX command MAC CE; and
    when the format of the SL DRX command MAC CE is format 2,
    the MAC CE subheader comprises
    a padding R field, a length L field, and a logical channel identification (LCID) field,
    wherein the L field is used to indicate the number of bytes occupied by the MAC CE payload, and
    the LCID field is used to indicate the format of the SL DRX command MAC CE.

2. The sidelink discontinuous reception implementation method according to claim 1, wherein the format of the SL DRX command MAC CE comprises:
    Format 1: only comprising a MAC CE subheader and not comprising a MAC CE payload; or
    Format 2: comprising a MAC CE subheader and a MAC CE payload.

3. The sidelink discontinuous reception implementation method according to claim 2, wherein the valid object and/or range of the SL DRX command MAC CE is indicated by one of the following methods:
    in a case that the format of the SL DRX command MAC CE is format 1, all information about the valid object and/or range of the SL DRX command MAC CE is indicated by at least one of the sidelink control information (SCI) and the sidelink shared channel (SL-SCH) subheader;
    in a case that the format of the SL DRX command MAC CE is format 2, all information about the valid object and/or range of the SL DRX command MAC CE is indicated by a MAC CE payload; and
    in a case that the SL DRX command MAC CE adopts format 2, the first part of information about the valid object and/or range of the SL DRX command MAC CE is indicated by at least one of the SCI and SL-SCH subheader, and the second part of information about the valid object and/or range of the SL DRX command MAC CE is indicated by the MAC CE payload.

4. The sidelink discontinuous reception implementation method according to claim 3, wherein the indication by at least one of the SCI and SL-SCH subheader comprises at least one of the following:
    indicated by a source address identifier carried in the SCI;
    indicated by a destination address identifier carried in the SCI;
    indicated by a source address field carried in the SL-SCH subheader; and
    indicated by a destination address field carried in the SL-SCH subheader.

5. The sidelink discontinuous reception implementation method according to claim 3, wherein the indication through the MAC CE payload comprises:
    the MAC CE payload carries at least one of the following information:
    destination information, wherein each bit of the index or BitMap of the destination information corresponds to a first upper layer ID;
    source address information, wherein each bit of an index or a BitMap of the source information corresponds to a second upper layer ID;
    at least one logical channel identifier (LCID) or logical channel group (LCG) information;
    cast type information;
    SL DRX configuration information, wherein each bit of an index or a BitMap of the SL DRX configuration information corresponds to a set of SL DRX parameters, and the set of SL DRX parameters are obtained through broadcast configuration or dedicated signaling configuration or second terminal configuration or pre-configuration;
    sidelink process (SL process) information, wherein each bit of an index or a BitMap of the SL process information corresponds to an SL process ID;

validity period information, wherein the validity period information is used to indicate the valid time of the SL DRX Command MAC CE; and direction information, wherein the direction information is used to indicate an active direction in which the SL DRX Command MAC CE activates/deactivates DRX.

6. The sidelink discontinuous reception implementation method according to claim 1, wherein the performing a first operation comprises at least one of the following:

stopping an SL DRX timer related to the valid object and/or range;

in a case that the valid object and/or range comprises validity period information, starting the SL DRX command MAC CE validity period timer, and after the SL DRX command MAC CE validity period timer expires, starting the SL DRX timer related to the valid object and/or range; and in a case that the valid object and/or range comprises SL DRX configuration information, starting, according to the SL DRX configuration information, an SL DRX timer related to the valid object and/or range.

7. An implementation method for sidelink discontinuous reception, comprising:

sending, by the second terminal, a sidelink discontinuous reception command media access control control element (SL DRX command MAC CE) to a first terminal, wherein the SL DRX command MAC CE carries a valid object and/or a range of the SL DRX command MAC CE;

wherein when the format of the SL DRX command MAC CE is format 1, the MAC CE subheader comprises a padding R field and a logical channel identifier (LCID) field, wherein the LCID field is used to indicate the format of the SL DRX command MAC CE; and when the format of the SL DRX command MAC CE is format 2, the MAC CE subheader comprises a padding R field, a length L field, and a logical channel identification (LCID) field, wherein the L field is used to indicate the number of bytes occupied by the MAC CE payload, and the LCID field is used to indicate the format of the SL DRX command MAC CE.

8. The sidelink discontinuous reception implementation method according to claim 7, wherein the format of the SL DRX command MAC CE comprises:

Format 1: only comprising a MAC CE subheader and not comprising a MAC CE payload; or Format 2: comprising a MAC CE subheader and a MAC CE payload.

9. The sidelink discontinuous reception implementation method according to claim 8, wherein the valid object and/or range of the SL DRX command MAC CE is indicated by one of the following methods:

in a case that the format of the SL DRX command MAC CE is format 1, all information about the valid object and/or range of the SL DRX command MAC CE is indicated by at least one of the sidelink control information (SCI) and the sidelink shared channel (SL-SCH) subheader;

in a case that the format of the SL DRX command MAC CE is format 2, all information about the valid object and/or range of the SL DRX command MAC CE is indicated by a MAC CE payload; and in a case that the SL DRX command MAC CE adopts format 2, the first part of information about the valid object and/or range of the SL DRX command MAC CE is indicated by at least one of the SCI and SL-SCH subheader, and the second part of information about the valid object and/or range of the SL DRX command MAC CE is indicated by the MAC CE payload.

10. The sidelink discontinuous reception implementation method according to claim 9, wherein the indication by at least one of the SCI and SL-SCH subheader comprises at least one of the following:

indicated by a source address identifier carried in the SCI;

indicated by a destination address identifier carried in the SCI;

indicated by a source address field carried in the SL-SCH subheader; and indicated by a destination address field carried in the SL-SCH subheader.

11. The sidelink discontinuous reception implementation method according to claim 9, wherein the indication through the MAC CE payload comprises:

the MAC CE payload carries at least one of the following information:

destination information, wherein each bit of the index or BitMap of the destination information corresponds to a first upper layer ID;

source address information, wherein each bit of an index or a BitMap of the source information corresponds to a second upper layer ID;

at least one logical channel identifier (LCID) or logical channel group (LCG) information;

cast type information;

SL DRX configuration information, wherein each bit of an index or a BitMap of the SL DRX configuration information corresponds to a set of SL DRX parameters, and the set of SL DRX parameters are obtained through broadcast configuration or dedicated signaling configuration or second terminal configuration or pre-configuration;

sidelink process (SL process) information, wherein each bit of an index or a BitMap of the SL process information corresponds to an SL process ID;

validity period information, wherein the validity period information is used to indicate the valid time of the SL DRX Command MAC CE; and direction information, wherein the direction information is used to indicate an active direction in which the SL DRX Command MAC CE activates/deactivates DRX.

12. A terminal, comprising: a processor, a memory, and a program or an instruction stored in the memory and capable of running on the processor, wherein when the program or instruction is executed by the processor, the steps of the sidelink discontinuous reception implementation method according to claim 7 are implemented.

13. The terminal according to claim 12, wherein the format of the SL DRX command MAC CE comprises:

Format 1: only comprising a MAC CE subheader and not comprising a MAC CE payload; or Format 2: comprising a MAC CE subheader and a MAC CE payload;

wherein when the format of the SL DRX command MAC CE is format 1, the MAC CE subheader comprises a padding R field and a logical channel identifier (LCID) field, wherein the LCID field is used to indicate the format of the SL DRX command MAC CE; and when the format of the SL DRX command MAC CE is format 2, the MAC CE subheader comprises a padding R field, a length L field, and a logical channel identification (LCID) field, wherein the L field is used to indicate the number of bytes occupied by the MAC CE payload, and the LCID field is used to indicate the format of the SL DRX command MAC CE.

14. A terminal, comprising:
a processor,
a memory, and
a program or an instruction stored in the memory and capable of running on the processor,
wherein when the program or instruction is executed by the processor, the following steps are implemented:
receiving, by a first terminal, a sidelink discontinuous reception command media access control control element (SL DRX command MAC CE) sent by a second terminal,
wherein the SL DRX command MAC CE carries a valid object and/or a range of the SL DRX command MAC CE; and
performing, by the first terminal, a first operation according to the valid object and/or range of the SL DRX command MAC CE;
wherein when the format of the SL DRX command MAC CE is format 1,
the MAC CE subheader comprises
a padding R field and a logical channel identifier (LCID) field,
wherein the LCID field is used to indicate the format of the SL DRX command MAC CE; and
when the format of the SL DRX command MAC CE is format 2, the MAC CE subheader comprises
a padding R field, a length L field, and a logical channel identification (LCID) field,
wherein the L field is used to indicate the number of bytes occupied by the MAC CE payload, and
the LCID field is used to indicate the format of the SL DRX command MAC CE.

15. The terminal according to claim 14, wherein the format of the SL DRX command MAC CE comprises:
Format 1: only comprising a MAC CE subheader and not comprising a MAC CE payload; or
Format 2: comprising a MAC CE subheader and a MAC CE payload.

16. The terminal according to claim 15, wherein the valid object and/or range of the SL DRX command MAC CE is indicated by one of the following methods:
in a case that the format of the SL DRX command MAC CE is format 1, all information about the valid object and/or range of the SL DRX command MAC CE is indicated by at least one of the sidelink control information (SCI) and the sidelink shared channel (SL-SCH) subheader;
in a case that the format of the SL DRX command MAC CE is format 2, all information about the valid object and/or range of the SL DRX command MAC CE is indicated by a MAC CE payload; and
in a case that the SL DRX command MAC CE adopts format 2, the first part of information about the valid object and/or range of the SL DRX command MAC CE is indicated by at least one of the SCI and SL-SCH subheader, and the second part of information about the valid object and/or range of the SL DRX command MAC CE is indicated by the MAC CE payload;
wherein the indication by at least one of the SCI and SL-SCH subheader comprises at least one of the following:
indicated by a source address identifier carried in the SCI;
indicated by a destination address identifier carried in the SCI;
indicated by a source address field carried in the SL-SCH subheader; and
indicated by a destination address field carried in the SL-SCH subheader;
wherein the indication through the MAC CE payload comprises:
the MAC CE payload carries at least one of the following information:
destination information, wherein each bit of the index or BitMap of the destination information corresponds to a first upper layer ID;
source address information, wherein each bit of an index or a BitMap of the source information corresponds to a second upper layer ID;
at least one logical channel identifier (LCID) or logical channel group (LCG) information;
cast type information;
SL DRX configuration information, wherein each bit of an index or a BitMap of the SL DRX configuration information corresponds to a set of SL DRX parameters, and the set of SL DRX parameters are obtained through broadcast configuration or dedicated signaling configuration or second terminal configuration or pre-configuration;
sidelink process (SL process) information, wherein each bit of an index or a BitMap of the SL process information corresponds to an SL process ID;
validity period information, wherein the validity period information is used to indicate the valid time of the SL DRX Command MAC CE; and
direction information, wherein the direction information is used to indicate an active direction in which the SL DRX Command MAC CE activates/deactivates DRX.

17. The terminal according to claim 14, wherein the performing a first operation comprises at least one of the following:
stopping an SL DRX timer related to the valid object and/or range;
in a case that the valid object and/or range comprises validity period information, starting the SL DRX command MAC CE validity period timer, and after the SL DRX command MAC CE validity period timer expires, starting the SL DRX timer related to the valid object and/or range; and
in a case that the valid object and/or range comprises SL DRX configuration information, starting, according to the SL DRX configuration information, an SL DRX timer related to the valid object and/or range.

* * * * *